(12) United States Patent
Ito et al.

(10) Patent No.: US 12,508,894 B2
(45) Date of Patent: Dec. 30, 2025

(54) CONTROL METHOD OF FOUR-WHEEL DRIVE SYSTEM WITH BOOSTING OPERATION

(71) Applicant: DENSO CORPORATION, Kariya (JP)

(72) Inventors: Takeshi Ito, Shanghai (CN); Aiyuan Qian, Shanghai (CN)

(73) Assignee: DENSO CORPORATION, Kariya (JP)

( * ) Notice: Subject to any disclaimer, the term of this patent is extended or adjusted under 35 U.S.C. 154(b) by 446 days.

(21) Appl. No.: 18/181,091

(22) Filed: Mar. 9, 2023

(65) Prior Publication Data

US 2023/0211657 A1 Jul. 6, 2023

Related U.S. Application Data

(63) Continuation of application No. PCT/JP2021/032763, filed on Sep. 7, 2021.

(30) Foreign Application Priority Data

Sep. 29, 2020 (CN) .......................... 202011052588.7

(51) Int. Cl.
*B60K 6/52* (2007.10)
*B60K 1/02* (2006.01)
*B60W 20/13* (2016.01)

(52) U.S. Cl.
CPC .................. *B60K 6/52* (2013.01); *B60K 1/02* (2013.01); *B60W 20/13* (2016.01)

(58) Field of Classification Search
CPC ............ B60K 6/52; B60K 1/02; B60W 20/13
See application file for complete search history.

(56) References Cited

U.S. PATENT DOCUMENTS

| 8,091,665 | B2 * | 1/2012 | Kuno .................... | B60W 10/02 180/65.31 |
| 8,448,542 | B2 * | 5/2013 | Nagamori ............ | B60W 10/08 477/3 |
| 2016/0229293 | A1 | 8/2016 | Seo et al. | |
| 2017/0253144 | A1 * | 9/2017 | Arima .................... | B60L 15/007 |
| 2017/0282750 | A1 | 10/2017 | Shimizu et al. | |
| 2017/0282897 | A1 | 10/2017 | Shimizu et al. | |
| 2022/0126671 | A1 * | 4/2022 | Oshida ..................... | B60K 6/28 |
| 2023/0365001 | A1 * | 11/2023 | Hiroi ...................... | B60L 15/20 |
| 2024/0092343 | A1 * | 3/2024 | Honjo ............... | B60W 30/1843 |

FOREIGN PATENT DOCUMENTS

WO WO-2024116300 A1 * 6/2024 ............. B60L 50/16

* cited by examiner

*Primary Examiner* — Faye M Fleming
(74) *Attorney, Agent, or Firm* — Oliff PLC

(57) ABSTRACT

A four-wheel drive system with boosting operation includes: a battery; a voltage boosting device; a front wheel drive unit connected parallel to the battery via the voltage boosting device and including a first motor generator and a first inverter; and a rear wheel drive unit connected parallel to the battery bypassing the voltage boosting device and including a second motor generator and a second inverter. An output power of front wheel drive unit is higher than an output power of rear wheel drive unit, and the output power of rear wheel drive unit is higher than a boosted output power of voltage boosting device. The control method of four-wheel drive system with boosting operation includes controlling the front and rear wheel drive units such that an output power flowing through the voltage boosting device does not exceed a rated boosted output power of voltage boosting device.

4 Claims, 7 Drawing Sheets

CONTROL METHOD OF FOUR-WHEEL DRIVE SYSTEM WITH BOOSTING OPERATION

CROSS REFERENCE TO RELATED APPLICATION

The present application is a continuation application of International Patent Application No. PCT/JP2021/032763 filed on Sep. 7, 2021, which designated the U.S. and claims the benefit of priority from Chinese Patent Application No. 202011052588.7 filed on Sep. 29, 2020. The entire disclosures of all of the above applications are incorporated herein by reference.

TECHNICAL FIELD

The present disclosure relates to a control method of four-wheel drive system, and more particularly to a control method of four-wheel drive system with boosting operation. The four-wheel drive system with boosting operation includes a voltage boosting device to perform the boosting operation.

BACKGROUND

Conventionally, in an electric vehicle, a four-wheel drive system with boosting operation, which is implemented by an electric drive system, performs the boosting operation to drive front wheels of the vehicle with a boosted voltage, and drives rear wheels of the vehicle with a non-boosted voltage.

SUMMARY

The present disclosure provides a control method of four-wheel drive system with boosting operation. The four-wheel drive system with boosting operation includes: a battery; a voltage boosting device; and a front and rear wheel drive unit connected parallel to the battery. The front wheel drive unit is connected to the battery via the voltage boosting device, and includes a first motor generator and a first inverter. The rear wheel drive unit is connected to the battery bypassing the voltage boosting device, and includes a second motor generator and a second inverter. An output power of the front wheel drive unit is set to be higher than an output power of the rear wheel drive unit, and the output power of the rear wheel drive unit is set to be higher than a boosted output power of the voltage boosting device. The control method of four-wheel drive system with boosting operation includes controlling the front wheel drive unit and the rear wheel drive unit under a condition that an output power flowing through the voltage boosting device does not exceed a rated boosted output power of the voltage boosting device.

BRIEF DESCRIPTION OF DRAWINGS

Objects, features and advantages of the present disclosure will become apparent from the following detailed description made with reference to the accompanying drawings. In the drawings.

DETAILED DESCRIPTION

Conventionally, in an electric vehicle, a four-wheel drive system with boosting operation performs the boosting operation, which is implemented by an electric drive system, drives front wheels of vehicle with a boosted voltage, and drives rear wheels of vehicle with a non-boosted voltage. The four-wheel drive system with boosting operation usually may include a variable voltage device (VVC) as a voltage boosting device (voltage boosting circuit).

In the above-described four-wheel drive system with boosting operation, in order to output a necessary electric current to an electric motor to ensure driving performance of the vehicle, an output from the voltage boosting circuit or an output power from a battery is required to be increased.

When the output from the voltage boosting circuit or the output power from the battery is increased, a rated output of the voltage boosting device included in the voltage boosting circuit is increased accordingly, or a large-capacity battery is required. This may cause increase in cost and increase in product size.

Thus, there exists a difficulty in how to optimize a control logic to ensure power drive and/or power recovery in the vehicle without increasing the rated power of voltage boosting device.

According to an aspect of the present disclosure, a control method of four-wheel drive system with boosting operation includes controlling a front wheel drive unit and a rear wheel drive unit of a vehicle under a predetermined condition. The four-wheel drive system with boosting operation includes: a battery supplying a driving power to the vehicle; a voltage boosting device; and a plurality of drive units connected in parallel to the battery, the plurality of drive units including the front wheel drive unit arranged close to front wheels of the vehicle relative to the battery and the rear wheel drive unit arranged close to rear wheels of the vehicle relative to the battery, the front wheel drive unit including a first motor generator and a first inverter connected to the first motor generator, the front wheel drive unit being connected to the battery via the voltage boosting device, the rear wheel drive unit including a second motor generator and a second inverter connected to the second motor generator, and the rear wheel drive unit being connected to the battery bypassing the voltage boosting device. An output power of the front wheel drive unit is set to be higher than an output power of the rear wheel drive unit, and the output power of the rear wheel drive unit is set to be higher than a boosted output power of the voltage boosting device. The front wheel drive unit and the rear wheel drive unit are controlled under the predetermined condition that an output power flowing through the voltage boosting device does not exceed a rated boosted output power of the voltage boosting device.

According to the above configuration, it is possible to reduce size and cost of the voltage boosting device (voltage boosting circuit) without using a voltage boosting device (voltage boosting circuit) with a higher rated output boost voltage or a battery with a higher output power. Accordingly, it is possible to reduce the size and cost of a vehicle equipped with the four-wheel drive system with boosting operation.

In addition, by reducing a diameter of cable that inputs or outputs a battery power, a compact size of the entire system can be realized.

In one embodiment, a front wheel drive unit may include an engine (ENG).

Figure 3:
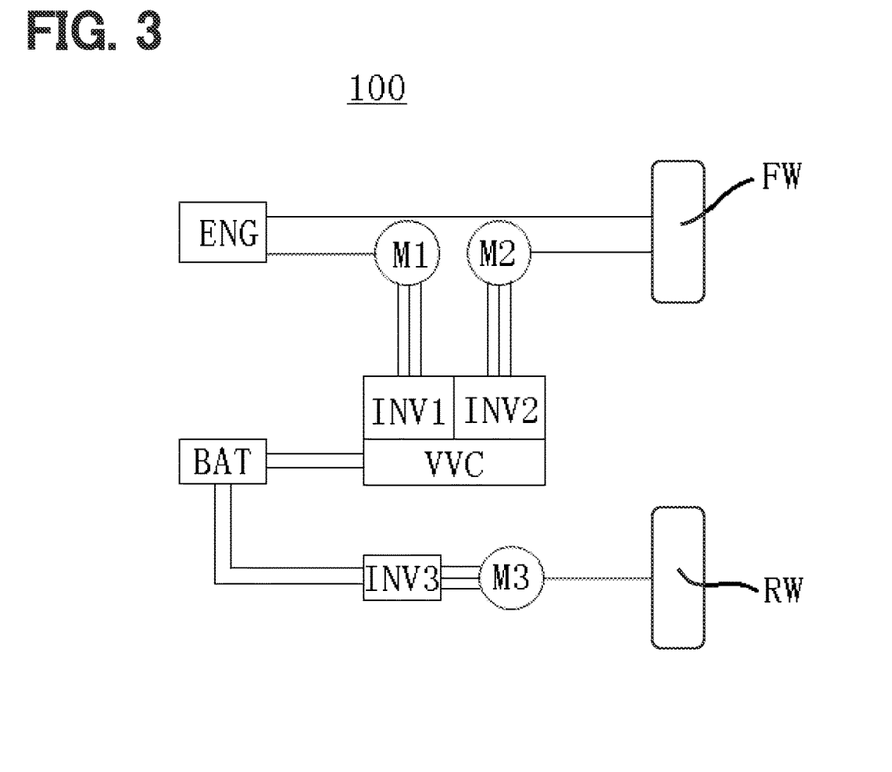
FIG. 3 is a system schematic diagram showing a hybrid electric vehicle (HEV) to which a control method of four-wheel drive system with boosting operation according to the present disclosure is applied, and the hybrid vehicle including a front-wheel voltage-boosted dual motor and a rear-wheel voltage-non-boosted single motor.

In one embodiment, in the four-wheel drive system with boosting operation, the front wheel drive unit may include a first motor generator M1 and an additional motor generator M2 arranged in parallel with the first motor generator M1. The four-wheel drive system with boosting operation may perform a control to such a front wheel driving system including multiple motors corresponding to the front wheels.

According to the above configuration, the control method of four-wheel drive system with boosting operation can be applied to a hybrid electric vehicle (hereinafter referred to as HEV vehicle) with front wheel single motor, a HEV vehicle with front wheel dual motor or front wheel multi-motor, and an electric vehicle (hereinafter referred to as EV vehicle). In addition, since a plug-in hybrid electric vehicle (hereinafter referred to as PHEV vehicle) has substantially the same structure as the HEV vehicle having front wheel dual motor, the control method of four-wheel drive system with boosting operation according to the present disclosure can also be applied to a PHEV vehicle.

For an HEV vehicle having a front wheel single motor and an HEV or PHEV vehicle having a front wheel dual motor or front wheel multi-motor, in a traveling driving mode, driving power output distribution method and specific output power may be determined based on output power required for driving the vehicle, an output power of battery, and a rated output boost voltage of voltage boosting device.

For an EV vehicle and an HEV or PHEV vehicle with a front wheel dual motor or front wheel multi-motor, in an energy recovery mode, an energy distribution method and a recovery electric power at the time of energy recovery may be determined based on the energy to be recovered and the rated output boost voltage of the voltage boosting device.

In the above configuration, the energy flow and the energy flowing through the voltage boosting device (voltage boosting circuit) and the battery based on the rated output boost voltage of the voltage boosting device. Thus, the energy flow can be optimized, and the loss generated in entire system can be reduced to minimum, thereby reducing a fuel consumption of the vehicle.

The following will describe an embodiment of the present disclosure. The control method according to the present disclosure is a control method of four-wheel drive system with boosting operation. The four-wheel drive system with boosting operation includes a voltage boosting device. The voltage boosting device is a part of the voltage boosting circuit.

Figure 1:
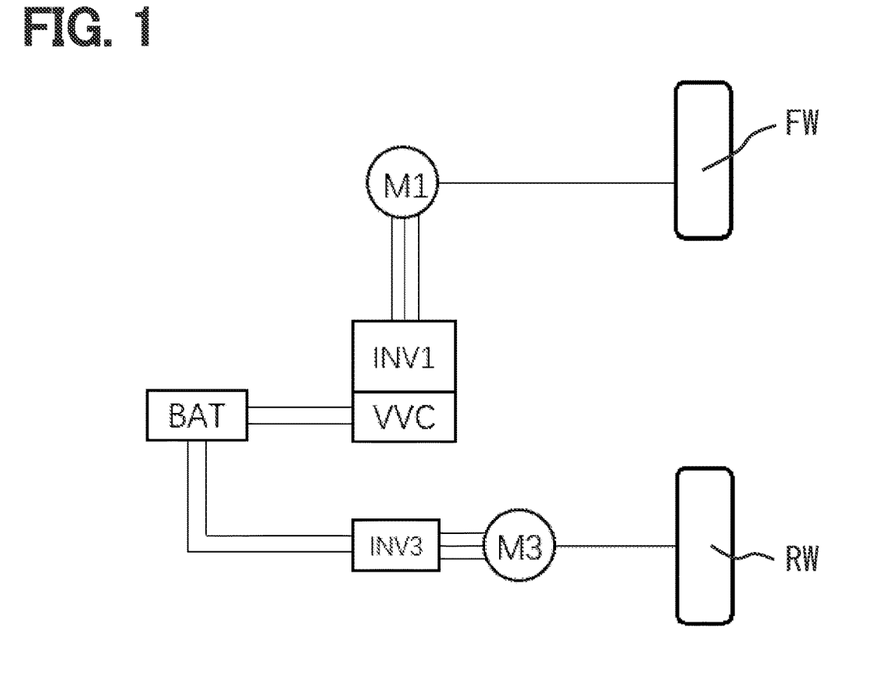
FIG. 1 is a system schematic diagram showing an electric vehicle (EV) to which a control method of four-wheel drive system with boosting operation according to the present disclosure is applied.
Figure 2:
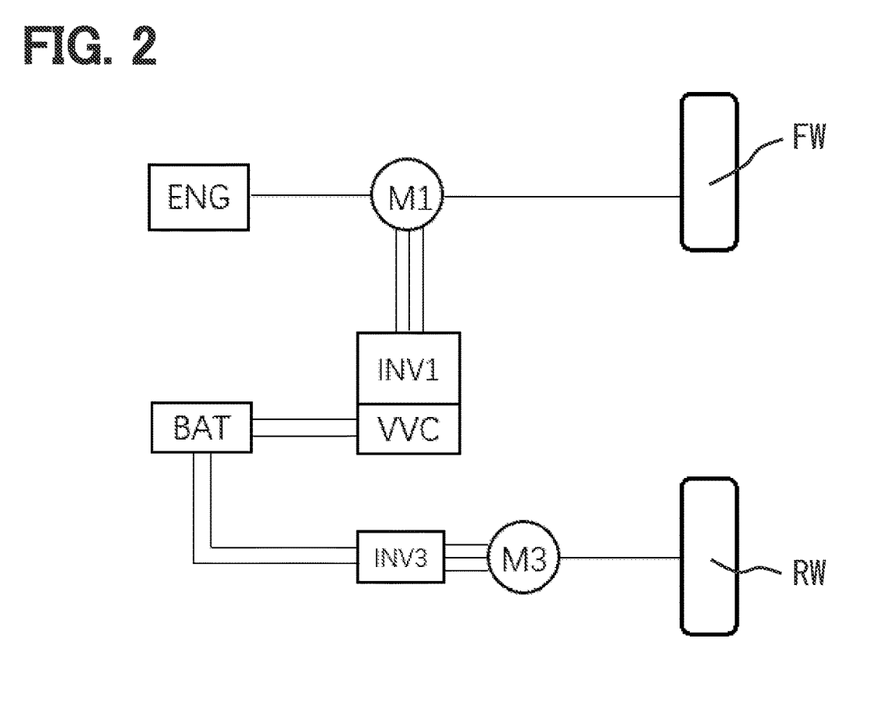
FIG. 2 is a system schematic diagram showing a hybrid electric vehicle (HEV) to which a control method of four-wheel drive system with boosting operation according to the present disclosure is applied, and the hybrid vehicle including a front-wheel voltage-boosted single motor and a rear-wheel voltage-non-boosted single motor.

As shown in FIG. 1 to FIG. 3, a four-wheel drive system with boosting operation (electric drive system) is installed to a vehicle. The vehicle includes front wheels FW, rear wheels RW, a battery BAT, multiple drive units, multiple inverters INV, and a voltage boosting device (voltage boosting circuit). In the drawings, the voltage boosting device is shown as VVC, which is abbreviation of variable voltage converter.

The vehicle to which the four-wheel drive system with boosting operation (electric drive system) is installed may be an EV vehicle (electric vehicle) shown in FIG. 1, an HEV vehicle (hybrid electric vehicle) having a front wheel single motor as shown in FIG. 2, or a HEV vehicle (hybrid electric vehicle) having a front wheel dual motor as shown in FIG. 3.

The multiple drive units include a front wheel drive unit and a rear wheel drive unit.

In the present disclosure, the term "front wheel side" refers to a location close to the front wheels FW relative to the battery BAT, and the term "rear wheel side" refers to a location close to the rear wheels RW relative to the battery BAT.

The front wheel drive unit may include a motor generator M1 (also referred to as a first motor generator) installed between the battery BAT and the front wheels FW shown in FIG. 1. Alternatively, the front wheel drive unit may include an engine ENG installed in front of the motor generator M1 as shown in FIG. 2. Alternatively, as shown in FIG. 3, the front wheel drive unit may further include a motor generator M2 (also referred to as additional motor generator) connected in parallel with the first motor generator M1. Here, the number of additional motor generator is not limited to one as shown in FIG. 3. For example, two or more additional motor generators may be included in the front wheel drive unit.

As shown in FIG. 1 to FIG. 3, the rear wheel drive unit includes a motor generator M3 (also referred to as a second motor generator) installed between the battery BAT and the rear wheels RW.

The motor generator can drive the front wheels FW and the rear wheels RW by converting the electric power from the battery BAT to a driving power. The motor generator can also convert the driving power recovered from the front wheels FW and the rear wheels RW to electric power for charging the battery BAT.

Among the multiple inverters INV1, INV2, INV3, one or more front wheel inverters INV1, INV2, which are also referred to as first inverters, are connected between the battery BAT and the front wheel drive unit as shown in FIG. 1 to FIG. 3. Among the multiple inverters INV1, INV2, INV3, a rear wheel inverter INV3, which is also referred to as a second inverter, is connected between the battery BAT and the rear wheel drive unit as shown in FIG. 1 to FIG. 3.

The voltage boosting device (voltage boosting circuit) VVC is installed between the inverter INV and the battery BAT, and the multiple drive units and the multiple inverters are connected in parallel with the voltage boosting device (voltage boosting circuit) VVC.

Figure 4:
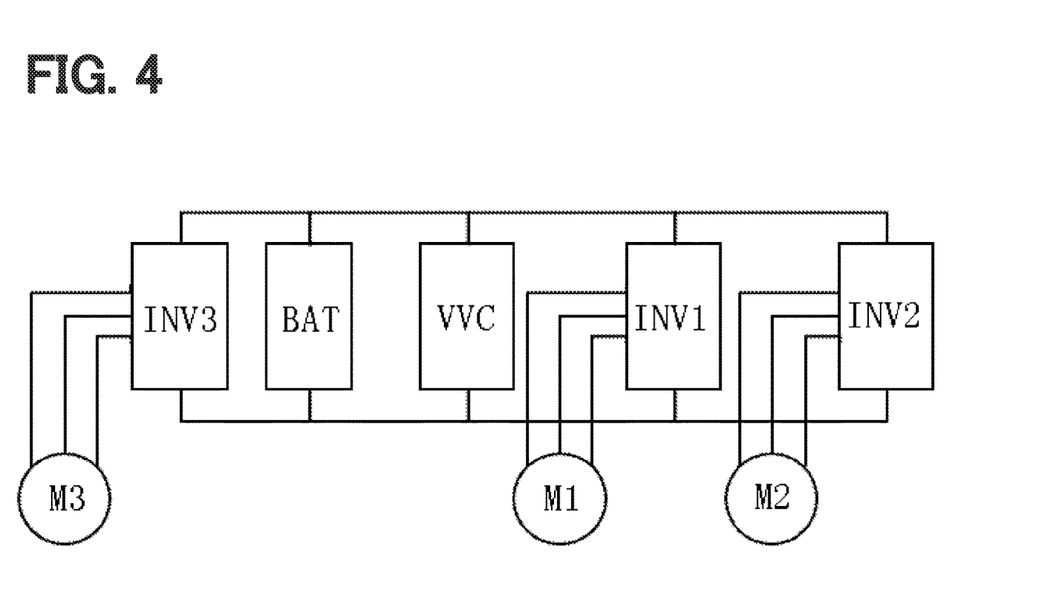
FIG. 4 is a system circuit diagram of the hybrid shown in FIG. 3.

FIG. 4 is a system circuit diagram showing a connection relationship of the voltage boosting device (voltage boosting circuit) VVC, the motor generators M1, M2, M3, the inverters INV1, INV2, INV3, and the battery BAT in the HEV vehicle.

As shown in FIG. 4, the motor generators M1, M2, M3 are connected in series with the inverters INV1, INV2, INV3, respectively. The inverters INV1, INV2, INV3 and corresponding motor generators M1, M2, M3 are connected in parallel with the voltage boosting device (voltage boosting circuit) VVC. Although not shown in the drawings, in the EV vehicle of FIG. 1 and in the HEV vehicle having front wheel single motor shown in FIG. 2, the motor generator M1 (or the motor generator M2) and the motor generator 3 are connected in series with the respective inverter INV1 (or the inverter INV2) and the inverter INV3. Further, the motor generator M1 (or the motor generator M2) and the motor generator M3, and the corresponding inverter INV1 (or the inverter INV2) and the inverter INV3 are connected in parallel with the voltage boosting device (voltage boosting circuit) VVC.

The following will describe the control method of four-wheel drive system with boosting operation according to the present disclosure with the HEV vehicle shown in FIG. 3 as an example.

Assume that an upper limit of output of the voltage boosting device (voltage boosting circuit VVC is 40 kW.

A power required to drive the vehicle varies due to different vehicle conditions and the driving habits of different drivers.

Figure 5:
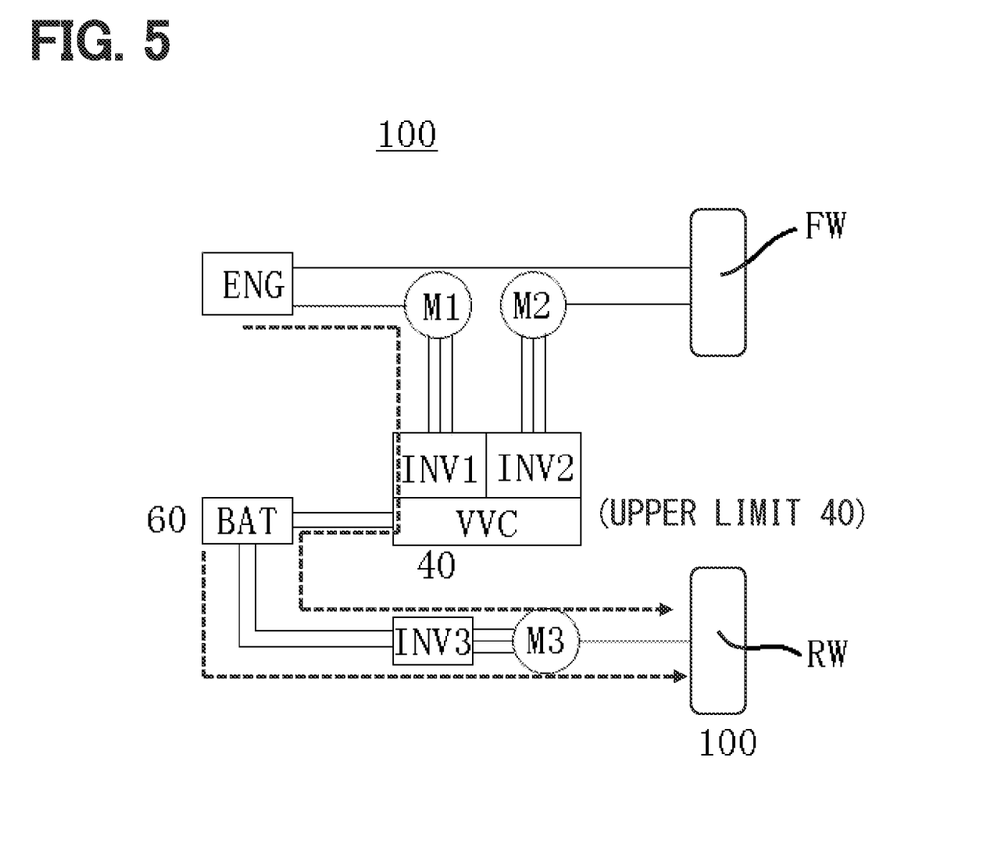
FIG. 5 is a system schematic diagram showing a control method when the HEV vehicle of FIG. 3 is driven with a sufficient battery output power.

For example, when the power required to drive the vehicle is 100 kW, the control method of four-wheel drive system with boosting operation according to the present disclosure performs the control as shown in FIG. 5. Specifically, the battery BAT outputs full electric power of 60 kW to the motor generator M3 to drive the rear wheels RW, and uses the engine ENG to drive the motor generator M1 to generate electric power. At this time, the generated electric power of 40 kW is provided to the motor generator M3 via the voltage boosting device (voltage boosting circuit) VVC to drive the rear wheels. In this way, the hybrid output of two power sources (a sum of output power from engine ENG and output power from battery BAT) can exactly satisfy a demand for traveling power of 100 kW.

Figure 6:
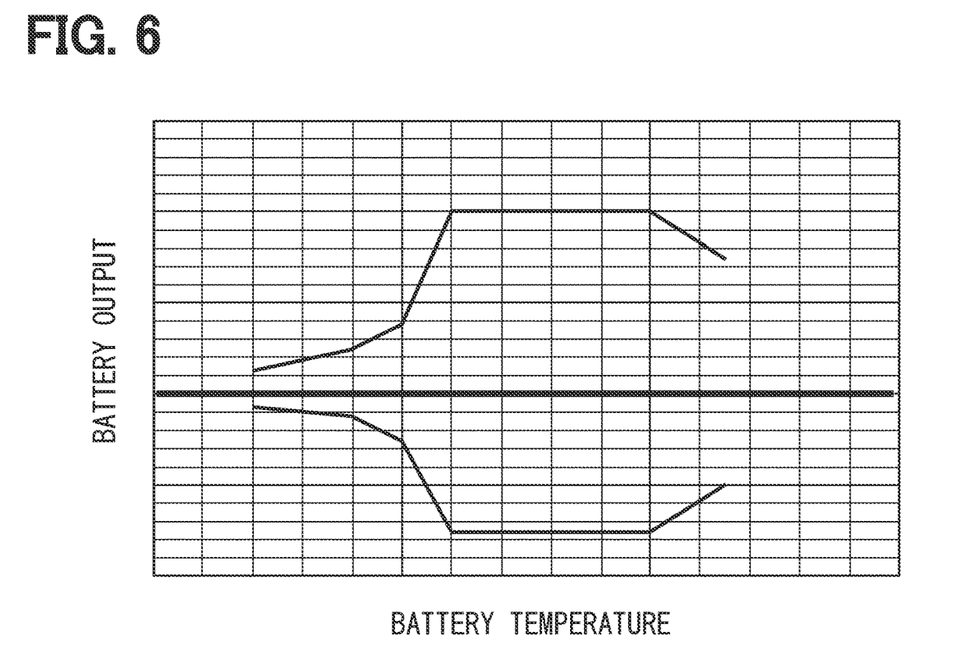
FIG. 6 is a graph showing a relationship between a battery temperature and a battery output power.

FIG. 6 is a graph showing a relationship between a battery temperature and a battery output power. When the battery temperature falls below a lower limit of a predetermined temperature range, the battery output power rapidly decreases. When the battery temperature exceeds an upper limit of the predetermined temperature range, the battery output power gradually decreases.

Figure 7:
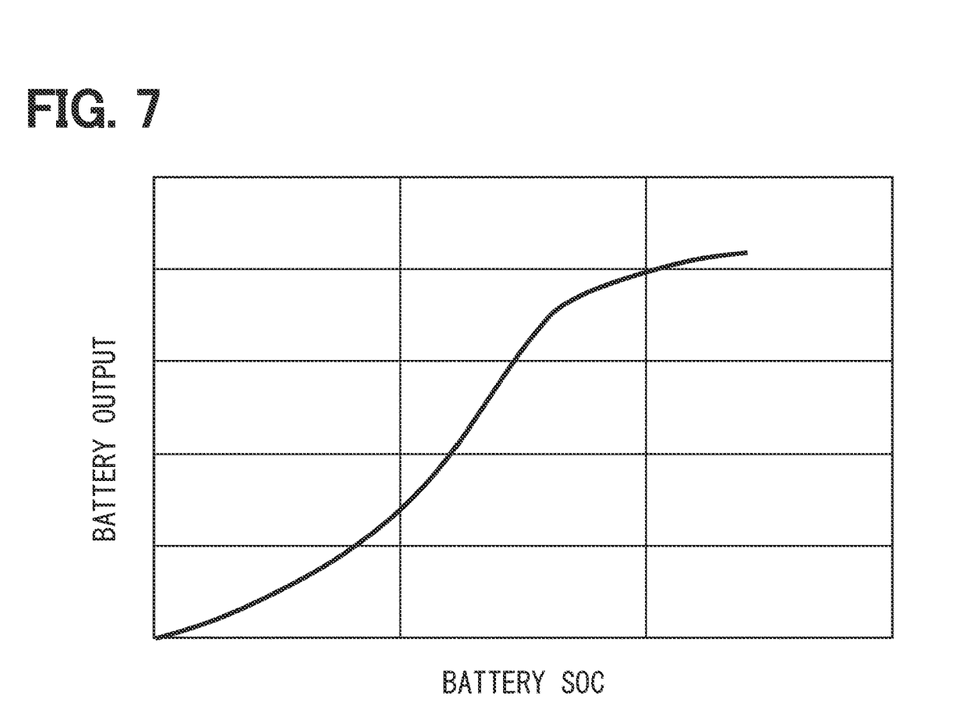
FIG. 7 is a graph showing a relationship between a battery SOC and a battery output power.

FIG. 7 is a graph showing a relationship between a battery SOC and the battery output power. As shown in FIG. 7, the battery output power gradually decreases as the battery SOC decreases.

When the battery temperature is too high or too low as shown in FIG. 6, or when the battery SOC is insufficient as shown in FIG. 7, the input power and output power of battery is limited by these factors (that is, not always full power of 60 kW).

Figure 8:
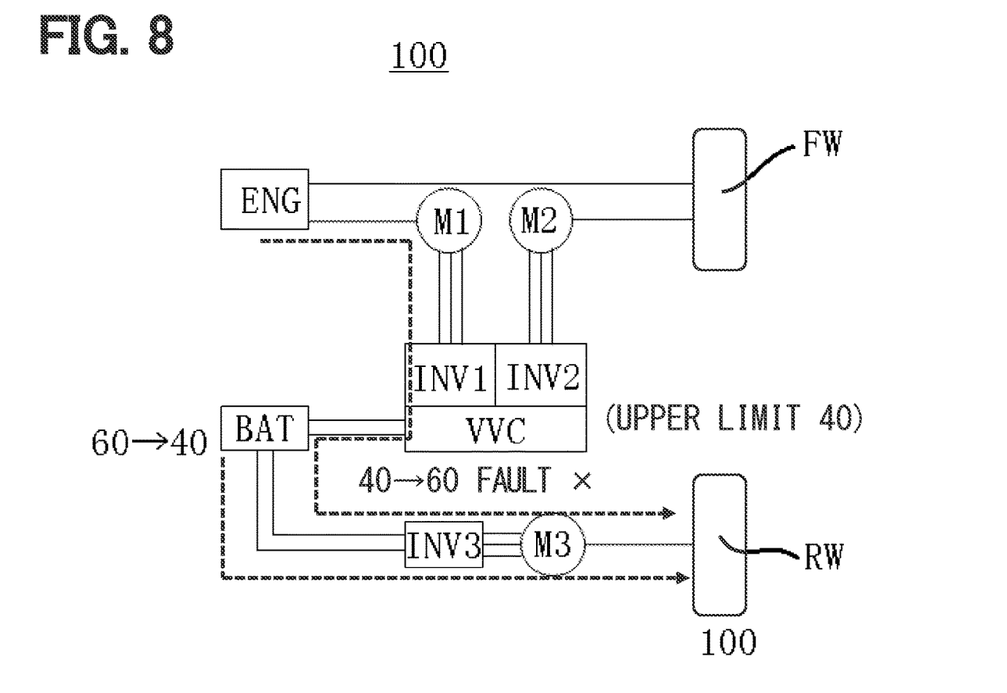
FIG. 8 is a schematic system diagram showing an example in which the vehicle is driven with an insufficient battery output power according to the control method shown in FIG. 5.

Assume that the power required for driving the vehicle is 100 kW similar to the above situation. When the output power of battery is limited by the above-described factors, assume that the battery outputs, to the motor generator M3, electric power of only 40 kW as an example. At this time, as shown in FIG. 8, when the electric power provided by the engine ENG via the motor generator M1 flows through the voltage boosting device (voltage boosting circuit) VVC and finally electric power of 60 kW is provided to the motor generator M3, the hybrid output is increased to 100 kW. However, the output power flowing through the voltage boosting device (voltage boosting circuit) VVC exceeds the upper limit of 40 kW, and a fault may occur in the voltage boosting device (voltage boosting circuit).

Figure 9:
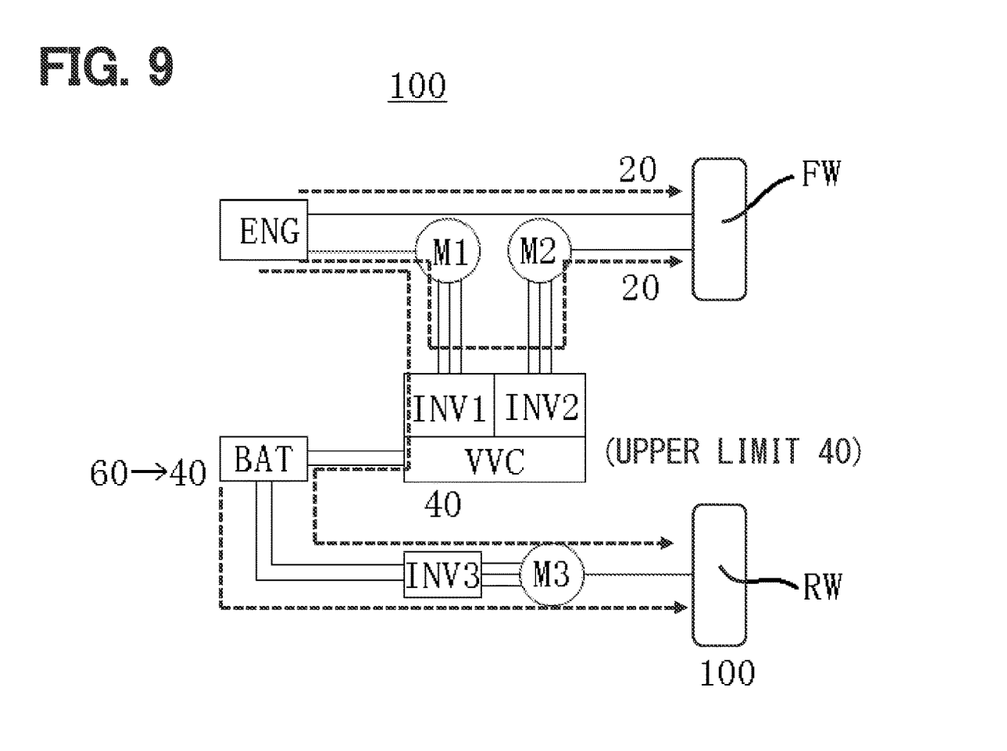
FIG. 9 is a system schematic diagram showing another control method when the HEV vehicle of FIG. 3 is driven with an insufficient battery output power.
Figure 10:
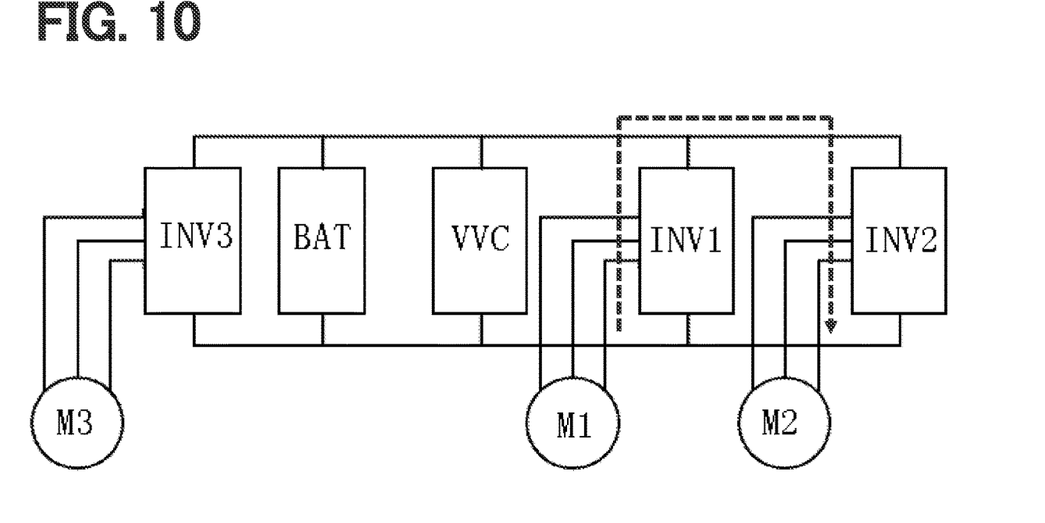
FIG. 10 is a system circuit diagram showing an electric current flow bypassing a voltage boosting device (voltage boosting circuit) when the control method shown in FIG. 9 is executed.

The control method of four-wheel drive system with boosting operation according to the present disclosure is shown in FIG. 9. The electric power provided from the engine ENG via the motor generator M1 and the voltage boosting device (voltage boosting circuit) VVC to the motor generator M3 is set to the upper limit of output of the voltage boosting device (voltage boosting circuit) VVC, that is, 40 kW. Then, the engine ENG may directly drive the front wheels FW to provide the insufficient electric power of 20 kW. Alternatively, the engine ENG may drive the motor generator M1 to generate electric power, and a part of the generated electric power, for example, 20 kW among the generated power may be provided to the front wheels via the motor generator M2. As shown in FIG. 10, in either case of directly driving the front wheels FW or driving the front wheels FW via the motor generator M2, the voltage boosting device (voltage boosting circuit) VVC is bypassed. Thus, the driving power of 100 kW required for driving the vehicle can be provided while maintaining the upper limit of output from the voltage boosting device (voltage boosting circuit) VVC at 40 kW without exceeding the upper limit.

Figure 11:
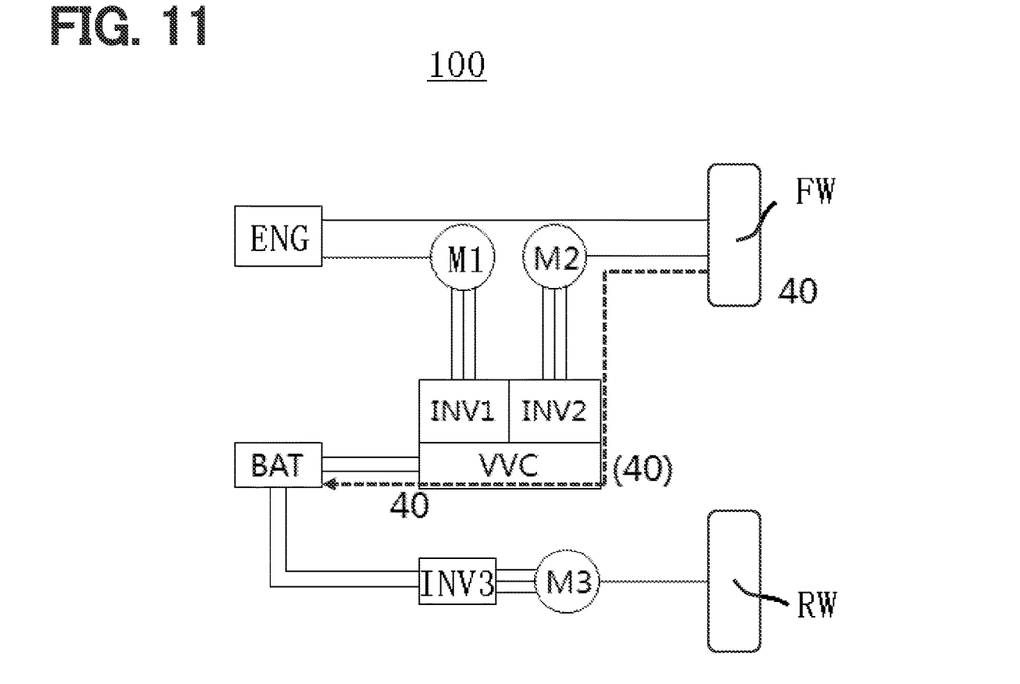
FIG. 11 is a system schematic diagram showing a control method in the HEV vehicle of FIG. 3 when energy to be recovered is small.

When recovering the energy by deceleration, assume that the energy to be recovered is 40 kW. In this case, the control method of four-wheel drive system with boosting operation according to the present disclosure is shown in FIG. 11. The energy of 40 kW recovered from the front wheels FW is regenerated by the motor generator M2, and is charged in the battery BAT via the voltage boosting device (voltage boosting circuit) VVC.

Figure 12:
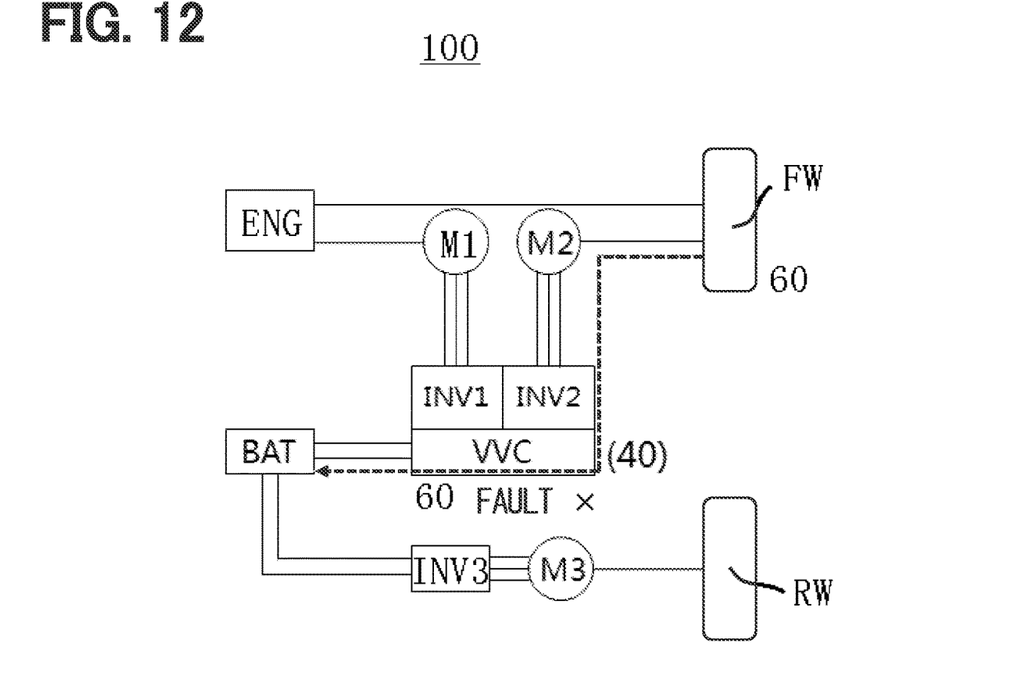
FIG. 12 is a schematic system diagram showing a case where a large amount of energy to be recovered is recovered according to the control method shown in FIG. 11.

In one example, assume that the energy to be recovered is greater than 40 kW, for example, 60 kW. In this case, as shown in FIG. 12, the entire energy of 60 kW to be recovered is received from the front wheels, regenerated by the motor generator M2, and then is transferred via the voltage boosting device (voltage boosting circuit) VVC, the output passing through the voltage boosting device (voltage boosting circuit) VVC is greater than the upper limit of 40 kW. Thus, a fault may occur in the voltage boosting device (voltage boosting circuit).

Figure 13:
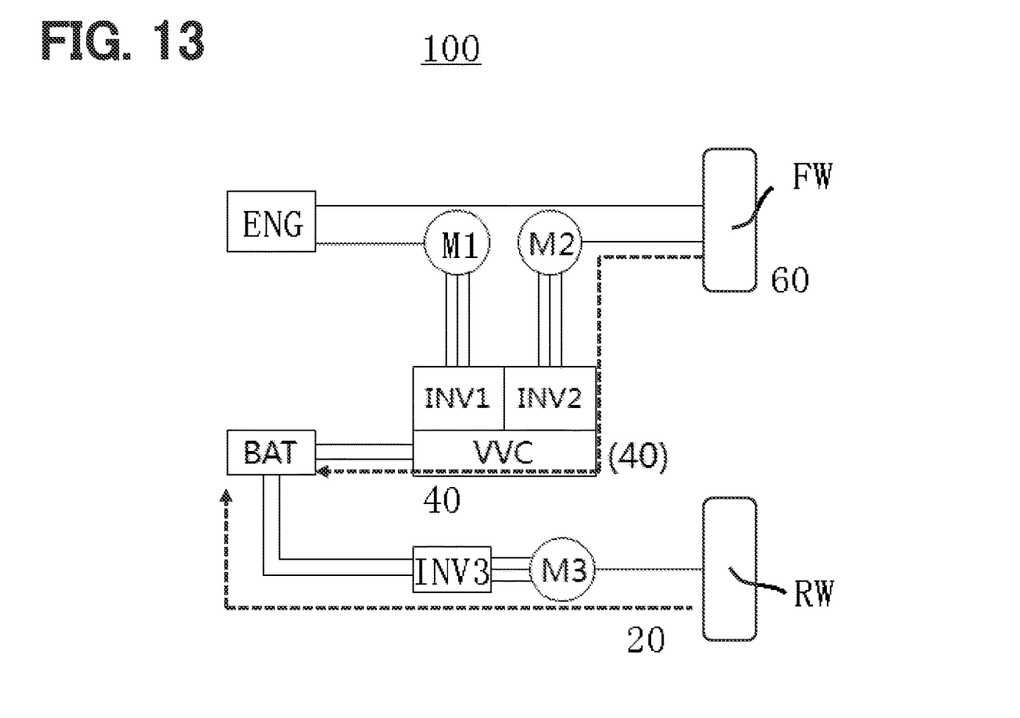
FIG. 13 is a system schematic diagram showing a control method in the HEV vehicle of FIG. 3 when energy to be recovered is large.

The control method of four-wheel drive system with boosting operation according to the present disclosure is shown in FIG. 13. The electric power, which is regenerated by the motor generator M2 and is transferred through the voltage boosting device (voltage boosting circuit) VVC to charge the battery BAT, may be limited to the same as upper limit of the output of voltage boosting device (voltage boosting circuit) VVC, that is, 40 kW. The remaining electric power of 20 kW may be received from the rear wheels RW and regenerated by the motor generator M3 to charge the battery. According to this configuration, the electric power flowing through the voltage boosting device (voltage boosting circuit) VVC can be controlled so as not to exceed the upper limit of output of voltage boosting device (voltage boosting circuit) VVC. Thus, in the deceleration state, the recovery energy can be increased and electric power used to charge the battery BAT can be increased.

In the present disclosure, an output power of the front wheel drive unit is set to be greater than an output power of the rear wheel drive unit, and the output power of the rear wheel drive unit is set to be greater than a boosted output power of the voltage boosting device VVC.

The present disclosure has been described based on examples, but it is understood that the present disclosure is not limited to the examples or structures. The present disclosure incorporates various modifications and variations within the scope of equivalents. Furthermore, various combination and formations, and other combinations and formations including one, more than one or less than one element are also within the scope of the present disclosure.

In the above embodiment, for convenience of explanation, specific numerical values, such as 40 kW, 60 kW, 100 kW are used as examples to describe the upper limit of output of voltage boosting device (voltage boosting circuit) VVC, the full output power of battery BAT, the output power required for driving the vehicle, and energy to be recovered. The parameters in the present disclosure are not limited to the above-described specific numerical values.

In the above embodiment, the specific description is made with reference to the HEV vehicle with front wheel dual motor shown in FIG. 3. The control method of four-wheel drive system with boosting operation according to the present disclosure can also be applied to the EV vehicle shown in FIG. 1 and the HEV vehicle with front wheel single motor shown in FIG. 2. For example, in the EV vehicle shown in FIG. 1, a part of the control method (the energy recovery method shown in FIG. 13) according to the above embodiment of the present disclosure may be applied. In this case, when recovering the energy, the electric power passing through the voltage boosting device (voltage boosting circuit) VVC may be controlled to not exceed the upper limit of the output of the voltage boosting device (voltage boosting circuit) VVC. For example, in the HEV vehicle having the front wheel single motor shown in FIG. 2, a part of the control method (the vehicle drive method shown in FIG. 5 and FIG. 9) according to the above embodiment of the present disclosure may be applied. In this case, when driving the vehicle, the electric power passing through the voltage boosting device (voltage boosting circuit) VVC may be controlled to not exceed the upper limit of the output of the voltage boosting device (voltage boosting circuit) VVC.

In the above embodiment, the vehicle having one battery BAT is described as an example. The present disclosure is not limited to this configuration, and the control method according to the present disclosure can also be applied to a vehicle with multiple batteries having different functions. When multiple batteries are provided, the multiple batteries may be connected in parallel to the battery BAT used for driving the vehicle.

What is claimed is:

1. A control method of a four-wheel drive system with boosting operation, the control method comprising
controlling a front wheel drive unit and a rear wheel drive unit of a vehicle under a predetermined condition, wherein:
the four-wheel drive system with boosting operation includes:
a battery supplying a driving power to the vehicle;
a voltage boosting device; and
a plurality of drive units connected in parallel to the battery, the plurality of drive units including the front wheel drive unit arranged close to front wheels of the vehicle relative to the battery and the rear wheel drive unit arranged close to rear wheels of the vehicle relative to the battery, the front wheel drive unit including a first motor generator and a first inverter connected to the first motor generator, the front wheel drive unit being connected to the battery via the voltage boosting device, the rear wheel drive unit including a second motor generator and a second inverter connected to the second motor generator, and the rear wheel drive unit being connected to the battery bypassing the voltage boosting device;
an output power of the front wheel drive unit is set to be higher than an output power of the rear wheel drive unit, and the output power of the rear wheel drive unit is set to be higher than a boosted output power of the voltage boosting device;
the front wheel drive unit and the rear wheel drive unit are controlled under the predetermined condition that an output power flowing through the voltage boosting device does not exceed a rated boosted output power of the voltage boosting device;
the front wheel drive unit includes an engine; and
when an output power of the battery is limited, electric power is supplied via the voltage boosting device within an upper limit output of the voltage boosting device and insufficient power is supplied by the engine driving the front wheels bypassing the voltage boosting device.

2. The control method of the four-wheel drive system with boosting operation according to claim 1, wherein the engine directly drives the front wheels to supply the insufficient power.

3. The control method of the four-wheel drive system with boosting operation according to claim 1, wherein:
the front wheel drive unit further includes an additional motor generator connected in parallel with the first motor generator and an additional inverter connected with the additional motor generator, the additional motor generator being configured to drive the front wheels;
the additional inverter is connected with the battery via the voltage boosting device;
the engine drives the first motor generator; and
among the power generated when the engine drives the first motor generator, the insufficient power is supplied via the additional motor generator to drive the front wheels.

4. The control method of the four-wheel drive system with boosting operation according to claim 3, wherein, in a case where power is output to drive the vehicle:
the battery outputs a limited power to the second motor generator;
a power supplied from the engine to the second motor generator via the first motor generator and the voltage boosting device is set to the upper limit output of the voltage boosting device; and
the insufficient power is supplied by the engine directly driving the front wheels or, among the power generated when the engine drives the first motor generator, the insufficient power is supplied to the front wheels via the additional motor generator to drive the front wheels.

* * * * *